United States Patent [19]

Kasahara et al.

[11] Patent Number: 4,550,145
[45] Date of Patent: Oct. 29, 1985

[54] PROCESS FOR THE PRODUCTION OF PROPYLENE BLOCK COPOLYMERS BY A THREE STEP METHOD

[75] Inventors: Toshikazu Kasahara; Tsutomu Nishikawa, both of Ichihara, Japan

[73] Assignee: Idemitsu Petrochemical Co., Ltd., Tokyo, Japan

[21] Appl. No.: 559,381

[22] Filed: Dec. 8, 1983

[30] Foreign Application Priority Data

Dec. 27, 1982 [JP] Japan ................................. 57-226549

[51] Int. Cl.$^4$ ............................................ C08F 297/08
[52] U.S. Cl. .................................... 525/267; 525/247; 525/249; 525/268; 525/323
[58] Field of Search ............... 525/268, 323, 267, 249, 525/247

[56] References Cited

U.S. PATENT DOCUMENTS 3,480,696 11/1969 Hassell et al. ...................... 525/268
4,291,138 9/1981 Sato et al. ........................... 525/323

FOREIGN PATENT DOCUMENTS 2646189 4/1977 Fed. Rep. of Germany ...... 525/268
47-7141 2/1972 Japan ................................. 525/323
0083015 5/1983 Japan ................................. 525/323

*Primary Examiner*—Wilbert J. Briggs, Sr.
*Attorney, Agent, or Firm*—Frishauf, Holtz, Goodman & Woodward

[57] ABSTRACT

A process for producing a propylene block copolymer by a three-step reaction in the presence of a stereoregular catalyst. At the first step, propylene is polymerized at a temperature of 55° C. or more to form polypropylene having an intrinsic viscosity of from 0.5 to 3.5 in the prescribed amount. At the second step, propylene is polymerized at a temperature of from 30° to 90° C. to form polypropylene having an intrinsic viscosity of at least 4 in the prescribed amount. And at the third step, ethylene and propylene are copolymerized at a temperature of from 30° to 90° C. to form an ethylene-propylene copolymer having an intrinsic viscosity of at least three in the prescribed amount. The propylene block copolymer formed by the three steps is superior and well balanced in impact resistance and stiffness.

11 Claims, No Drawings

PROCESS FOR THE PRODUCTION OF PROPYLENE BLOCK COPOLYMERS BY A THREE STEP METHOD

BACKGROUND OF THE INVENTION

The present invention relates to a process for the production of propylene block copolymers. More particularly, it relates to a process for producing with high efficiency propylene block copolymers which are superior in physical properties, particularly in impact resistance and stiffness.

Crystalline polypropylene is superior in, for example, stiffness, heat resistance and surface gloss, but has a disadvantage in that its impact resistance is poor.

In order to overcome the disadvantage of poor impact resistance in the crystalline polypropylene, various methods in which propylene block copolymers containing an ethylene unit are produced have been proposed. One of the methods involves forming a propylene homopolymer at the first step, further polymerizing propylene at higher temperatures than in the first step at the second step, and then copolymerizing ethylene and propylene at the third step (see Japanese patent application Laid-Open No. 71712/1980). In accordance with these conventional methods, however, the productivity of the desired polymers drops and there cannot be produced copolymers which are well balanced in impact resistance and stiffness.

SUMMARY OF THE INVENTION

An object of the invention is to provide a process for producing with high efficiency propylene block copolymers which are superior and well balanced in impact resistance and stiffness.

It has been found that the object can be attained by producing propylene block copolymers by a three-step polymerization method while controlling the polymerization temperature at each step and also the intrinsic viscosity and amount of polymer formed at each step within specific ranges.

The present invention relates to a process for producing a propylene block copolymer by a three-step reaction in the presence of a stereoregular catalyst, which comprises:

polymerizing propylene at a temperature of at least 55° C. to form polypropylene having an intrinsic viscosity of from 0.5 to 3.5 in an amount of from 50 to 94% by weight based on the total amount of copolymers formed finally (first step);

polymerizing propylene at a temperature ranging between 30° and 90° C. to form polypropylene having an intrinsic viscosity of at least 4 in an amount of from 25 to 3% by weight based on the total amount of copolymers formed finally (second step); and copolymerizing ethylene and propylene at a temperature ranging between 30° and 90° C. to form an ethylene-propylene copolymer having an intrinsic viscosity of at least 3 in an amount of from 25 to 3% by weight based on the total amount of copolymers formed finally (third step).

DETAILED DESCRIPTION OF THE INVENTION

The term "stereoregular catalyst" as used herein refers to a catalyst which is generally used in a stereoregular polymerization reaction of, for example, ethylene and propylene, and it usually comprises a transition metal halogen compound component and an organoaluminum compound component.

Suitable examples of transition metal halogen compounds are titanium halides, with titanium trichloride being especially preferred. Various types of titanium trichloride can be used, including (1) titanium trichloride prepared by reducing titanium tetrachloride by various techniques, (2) titanium trichloride activated by further subjecting the titanium trichloride (1) to ball mill treatment and/or washing with solvents (e.g., inert solvents and/or polar compound-containing inert solvents), and (3) titanium trichloride prepared by subjecting titanium trichloride or a titanium trichloride eutectic compound (e.g., $TiCl_3 \cdot \frac{1}{3}AlCl_3$) to a copulverization treatment in combination with, for example, amines, ethers, esters, sulfur compounds, halogen compounds, and organic or inorganic nitrogen or phosphorus-containing compounds. In addition, titanium halides deposited on magnesium can be used.

Suitable examples of organoaluminum compounds are represented by the general formula: $AlR_nX_{3-n}$ (wherein R is an alkyl group containing from 1 to 10 carbon atoms, X is a halogen atom, and $0 < n \leq 3$). These examples include dimethylaluminum chloride, diethylaluminum chloride, ethylaluminum sesquichloride, ethylaluminum dichloride, and triethylaluminum. These compounds can be used singly or in a mixture comprising two or more thereof.

The molar ratio of the organoaluminum compound to the transition metal compound is usually from 1:1 to 100:1.

At the first step of the process of the invention, propylene is polymerized at a temperature of 55° C. or more, preferably from 61° to 70° C. to form polypropylene having an intrinsic viscosity $[\eta]$ of from 0.5 to 3.5, preferably from 0.7 to 3.0 in an amount of from 50 to 94% by weight, preferably from 70 to 90% by weight, based on the total amount of copolymers formed finally. If the polymerization temperature is lower than 55° C., the productivity of polymer drops. If the intrinsic viscosity is less than 0.5, the impact strength of the copolymer formed is low, whereas if it is more than 3.5, its moldability is reduced. Furthermore, if the amount of the polypropylene formed in the first step is less than 50% by weight based on the total amount of copolymers formed finally, the stiffness of the copolymer drops, whereas if it is more than 94% by weight, the impact strength of the copolymer drops.

At the second step, propylene is polymerized at a temperature of from 30° to 90° C., preferably from 40° to 70° C. to form polypropylene having an instrinsic viscosity of at least 4, preferably from 4.5 to 7.5 in an amount of from 25 to 3% by weight, preferably from 15 to 5% by weight based on the total amount of copolymers formed finally. If the intrinsic viscosity of polypropylene formed in the second step is less than 4, the impact strength of the copolymer formed finally drops. If the amount of the polypropylene formed in the second step is less than 3% by weight, the stiffness of the copolymer formed finally drops, whereas if it is more than 25% by weight, the impact strength of the copolymer undesirably drops.

At the third step, ethylene and propylene are copolymerized at a temperature of from 30° to 90° C., preferably from 40° to 70° C. to form an ethylene-propylene copolymer having an intrinsic viscosity of at least 3, preferably from 4 to 12 in an amount of from 25 to 3% by weight, preferably from 18 to 5% by weight based on the total amount of copolymers formed finally. If the intrinsic viscosity of the ethylenepropylene copolymer formed in the third step is less than 3, the impact strength of the copolymer formed finally drops. If the amount of the ethylene-propylene copolymer is less than 3% by weight, the impact strength of the copolymer formed finally drops, whereas if it is more than 25% by weight, the stiffness of the copolymer formed finally undesirably drops. Furthermore it is preferable for the ethylene-unit content of the ethylene-propylene copolymer to be controlled within the range of from 1 to 10% by weight, preferably from 2 to 8% by weight. If the ethylene-unit content is less than 1% by weight, the impact strength of the copolymer formed finally drops, and the amounts of non-crystalline polymers formed increase. On the other hand, if it is more than 10% by weight, the stiffness of the copolymer formed finally undesirably drops.

The intrinsic viscosity can be controlled by appropriately changing the concentration of a molecular weight modifier (e.g., hydrogen). The reaction pressure is from 1 to 30 kilograms per square centimeter and preferably from 2 to 15 kilograms per square centimeter at each step of the process of the invention.

The process of the invention can be performed by various techniques such as a method in which at least three reactors are used and polymerization is performed continuously, a method in which at least one reactor is used and polymerization is performed batchwise, and a combination thereof. The polymerization method is not critical; any of suspension polymerization, solution polymerization, gas phase polymerization, and so forth can be employed. Inert solvents which can be used in the suspension polymerization include aliphatic hydrocarbons such as hexane and heptane, alicyclic hydrocarbons such as cyclohexane, and aromatic hydrocarbons such as benzene and toluene.

The process of the invention offers various advantages. One of the advantages is that the productivity of the desired ethylene-propylene block copolymer is high. Another advantage is that the ethylene-propylene block copolymer is superior and further well balanced in impact resistance and stiffness. Another advantage is that the ethylene-propylene copolymer is superior in physical properties such as impact whitening, heat resistance, and surface gloss.

Hence the propylene block copolymer produced by the process of the invention is a very useful material for use in the fabrication of, for example, car parts and domestic electrical appliances.

The present invention is described in greater detail with reference to the following Examples 1 to 7.

EXAMPLES 1 TO 7

Five liters of dehydrated n-heptane was placed in a 10-liter autoclave equipped with a stirrer, and 1.0 gram of diethylaluminum chloride and 0.3 gram of titanium trichloride were added thereto.

As the first step of the process of the invention, propylene was polymerized with stirring for 90 minutes while maintaining the temperature of the liquid layer at 65° C., feeding a predetermined amount of hydrogen so that polypropylene had a given intrinsic viscosity, and also continuously feeding propylene so that the reaction pressure was 9 kilograms per centimeter. At the end of the time, unreacted propylene was removed and the temperature of the liquid layer was lowered to 50° C.

As the second step, propylene was polymerized for 40 minutes while maintaining a temperture of 50° C. and pressure of 9 kilograms per square centimeter, and continuously feeding predetermined amounts of hydrogen and propylene.

Finally, as the third step, a propylene/ethylene mixture and a prdetermined amount of hydrogen were introduced in the autoclave and polymerized for 30 minutes while maintaining the temperature at 50° C. At the end of the time, unreacted propylene was removed, and 50 milliliters of n-butanol was added to the polymerization product and stirred at 65° C. for 1 hour to decompose the catalyst. Then the thus-produced polymer was separated, washed and dried to obtain a white powdery polymer.

The physical properties of the polymer was measured, and the results are shown in the Table.

COMPARATIVE EXAMPLES 1 TO 4

The procedure of the Examples was repeated wherein the intrinsic viscosity and amount of the polymer formed at each step were changed. The results are shown in the Table.

TABLE

| | First Step | | Second Step | | Third Step | | Physical Properties of Copolymer Formed Finally | | | |
|---|---|---|---|---|---|---|---|---|---|---|
| Run No. | $[\eta]$*1 | Amount of Polymer (wt %) | $[\eta]$*1 | Amount of Polymer (wt %) | $[\eta]$*1 | Amount of Copolymer (wt %) | Ethylene-unit*2 Content (wt %) | MI*3 (g/10 min.) | Impact*4 Strength (kg · cm/cm) | Stiffness*5 (kg/cm²) |
| Example 1 | 2.9 | 76 | 5.9 | 10 | 4.6 | 14 | 2.9 | 0.27 | 41 | 9700 |
| Example 2 | 2.4 | 78 | 7.2 | 12 | 9.4 | 10 | 6.2 | 0.36 | 46 | 9900 |
| Example 3 | 2.3 | 80 | 4.9 | 10 | 4.6 | 10 | 4.0 | 0.80 | 24 | 9400 |
| Example 4 | 1.3 | 83 | 5.3 | 7 | 7.7 | 10 | 5.0 | 9.3 | 29 | 11700 |
| Example 5 | 1.0 | 83 | 4.7 | 7 | 5.2 | 10 | 4.7 | 28 | 5.3 | 12400 |
| Example 6 | 0.75 | 80 | 4.6 | 10 | 4.4 | 10 | 4.3 | 45 | 3.8 | 13200 |
| Example 7 | 2.8 | 75 | 5.5 | 10 | 4.7 | 18 | 12 | 0.31 | 79 | 7300 |
| Comparative Example 1 | 2.8 | 89 | — | — | 4.9 | 11 | 3.0 | 0.30 | 31 | 8200 |
| Comparative Example 2 | 4.0 | 76 | 5.9 | 10 | 4.5 | 14 | | unmoldable | | |
| Comparative Example 3 | 2.9 | 76 | 3.0 | 10 | 4.5 | 14 | 3.0 | 0.52 | 11 | 10700 |
| Comparative | 2.7 | 60 | 4.5 | 10 | 3.2 | 30 | 3.5 | 0.29 | 85 | 6300 |

TABLE-continued

| Run No. | First Step | | Second Step | | Third Step | | Physical Properties of Copolymer Formed Finally | | | |
|---|---|---|---|---|---|---|---|---|---|---|
| | [η]*1 | Amount of Polymer (wt %) | [η]*1 | Amount of Polymer (wt %) | [η]*1 | Amount of Copolymer (wt %) | Ethylene-unit*2 Content (wt %) | MI*3 (g/10 min.) | Impact*4 Strength (kg · cm/cm) | Stiffness*5 (kg/cm²) |
| Example 4 | | | | | | | | | | |

Note:
*1[η] (Intrisic viscosity) as determined at 135° C. in decalin.
*2Ethylene-unit content as determined by an infrared spectrum method.
*3MI (Melt index) as determined according to JIS K 7210.
*4Impact strength as determined according to JIS K 7110 (Izod Impact Strength Test).
*5Stiffness as determined according to JIS K 7106 (Olsen Stiffness Test).

What is claimed is:

1. A process for producing a propylene block copolymer by a three-step reaction in the presence of a stereoregular catalyst, which comprises:
   (1) polymerizing propylene at a temperature of 55° C. or more to form polypropylene having an intrinsic viscosity of from 0.5 to 3.5 in an amount of from 50 to 94% by weight based on the total amount of the final propylene block copolymer formed during this three-step reaction;
   (2) polymerizing propylene at a temperature of from 30° to 90° C. to form polypropylene in an amount of from 25 to 3% by weight based on the total amount of the final propylene block copolymer formed during this three-step reaction, the polypropylene formed during this second step having an intrinsic viscosity of at least 4; and
   (3) copolymerizing ethylene and propylene at a temperature of from 30° to 90° C. to form an ethylene-propylene copolymer in an amount of from 25 to 3% by weight based on the total amount of the final propylene block copolymer formed during this three-step reaction, the ethylene-propylene copolymer formed during this third step having an intrinsic viscosity of at least 3.

2. The process of claim 1, wherein the stereoregular catalyst comprises a transition metal halogen compound component and an organoaluminum compound component.

3. The process of claim 1, wherein at the first step, propylene is polymerized at a temperature of from 61° to 70° C. to form polypropylene having an intrinsic viscosity of from 0.7 to 3.0 in an amount of from 70 to 90% by weight based on the total amount of the propylene block copolymer formed finally.

4. The process of claim 1, wherein at the second step, propylene is polymerized at a temperature of from 40° to 70° C. to form polypropylene having an intrinsic viscosity of from 4.5 to 7.5 in amount of from 15 to 5% by weight based on the total amount of the propylene block copolymer formed finally.

5. The process of claim 1, wherein at the third step, ethylene and propylene are copolymerized at a temperature of from 40° to 70° C. to form an ethylene-propylene copolymer having an intrinsic viscosity of from 4 to 12 in an amount of from 18 to 5% by weight based on the total amount of the propylene block copolymer formed finally.

6. The process of claim 1, wherein the ethylene-unit content of the ethylene-propylene copolymer formed at the third step is within the range of from 1 to 10% by weight.

7. The process of claim 5, wherein the ethylene-unit content of the ethylene-propylene copolymer formed at the third step is within the range of from 1 to 10% by weight.

8. The process of claim 1,
   wherein at the first step, propylene is polymerized at a temperature of from 61° to 70° C. to form polypropylene having an intrinsic viscosity of from 0.7 to 3.0 in an amount of from 70 to 90% by weight based on the total amount of the final propylene block copolymer formed during this three-step reaction;
   wherein at the second step, propylene is polymerized at a temperature of from 40° to 70° C. to form polypropylene having an intrinsic viscosity of from 4.5 to 7.5 in an amount of from 15 to 5% by weight based on the total amount of the final propylene block copolymer formed during this three-step reaction; and
   wherein at the third step, ethylene and propylene are copolymerized at a temperature of from 40° to 70° C. to form an ethylene-propylene copolymer having an intrinsic viscosity of from 4 to 12 in an amount of from 18 to 5% by weight based on the total amount of the final propylene block copolymer formed during this three-step reaction.

9. The process of claim 8, wherein the ethylene-unit content of the ethylene-propylene copolymer formed at the third step is within the range of from 2 to 8% by weight.

10. The process of claim 9, wherein said stereoregular catalyst comprises a transition metal halogen compound component and an organoaluminum compound component.

11. The process of claim 8, wherein the ethylene-unit content of the ethylene-propylene copolymer formed at the third step is within the range of from 1 to 10% by weight.

* * * * *